(12) United States Patent
Makhlouf et al.

(10) Patent No.: US 10,575,164 B1
(45) Date of Patent: Feb. 25, 2020

(54) DYNAMICALLY ALLOWING A GUEST DEVICE TO A JOIN A PRIVATE CBRS NETWORK

(71) Applicant: MOTOROLA SOLUTIONS, INC., Chicago, IL (US)

(72) Inventors: Isam R. Makhlouf, Lake Zurich, IL (US); Ethan Y. Chen, Wilmette, IL (US); Badarinath Patibandla, Schaumburg, IL (US); David G. Wiatrowski, Woodstock, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/360,974

(22) Filed: Mar. 21, 2019

(51) Int. Cl.
*H04W 8/06* (2009.01)
*H04W 8/18* (2009.01)
*H04W 84/10* (2009.01)

(52) U.S. Cl.
CPC ............... *H04W 8/06* (2013.01); *H04W 8/18* (2013.01); *H04W 84/105* (2013.01)

(58) Field of Classification Search
CPC ...................................................... H04W 8/06
USPC .................................. 455/410, 411, 433, 454
See application file for complete search history.

(56) References Cited

U.S. PATENT DOCUMENTS

| | | | |
|---|---|---|---|
| 5,511,232 | A | 4/1996 | O'Dea et al. |
| 5,742,904 | A | 4/1998 | Pinder et al. |
| 8,116,327 | B2 | 2/2012 | Schuette et al. |
| 9,226,124 | B2 | 12/2015 | Schuler et al. |
| 2011/0170481 | A1 | 7/2011 | Gomes et al. |
| 2011/0171915 | A1 | 7/2011 | Gomes et al. |
| 2011/0237250 | A1 | 9/2011 | Horn et al. |

*Primary Examiner* — Joel Ajayi
(74) *Attorney, Agent, or Firm* — Michael Best & Friedrich LLP

(57) ABSTRACT

Methods and systems for dynamically allowing a guest device to a join a private citizens broadband radio systems (CBRS) network. The method includes determining one of a location of the guest device and a location of a public safety incident. The public safety incident is associated with the guest device. The method also includes determining that one of the location of the guest device and the location of the public safety incident is in a coverage area of the private CBRS network. The method further includes reconfiguring the private CBRS network to allow operation of the guest device on the private CBRS network, and operating the guest device on the private CBRS network.

17 Claims, 6 Drawing Sheets

DYNAMICALLY ALLOWING A GUEST DEVICE TO A JOIN A PRIVATE CBRS NETWORK

BACKGROUND OF THE INVENTION

Public safety land mobile radio (LMR) systems are known for their reliability and broad coverage. However, even with broad coverage, user devices may still experience coverage and capacity limitations due to budget constraints, terrain, building penetration losses and the like. In addition, public safety broadband data systems, for example, the FirstNet first responder network authority, may not provide Long Term Evolution (LTE) coverage at LMR levels of reliability and broad coverage.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
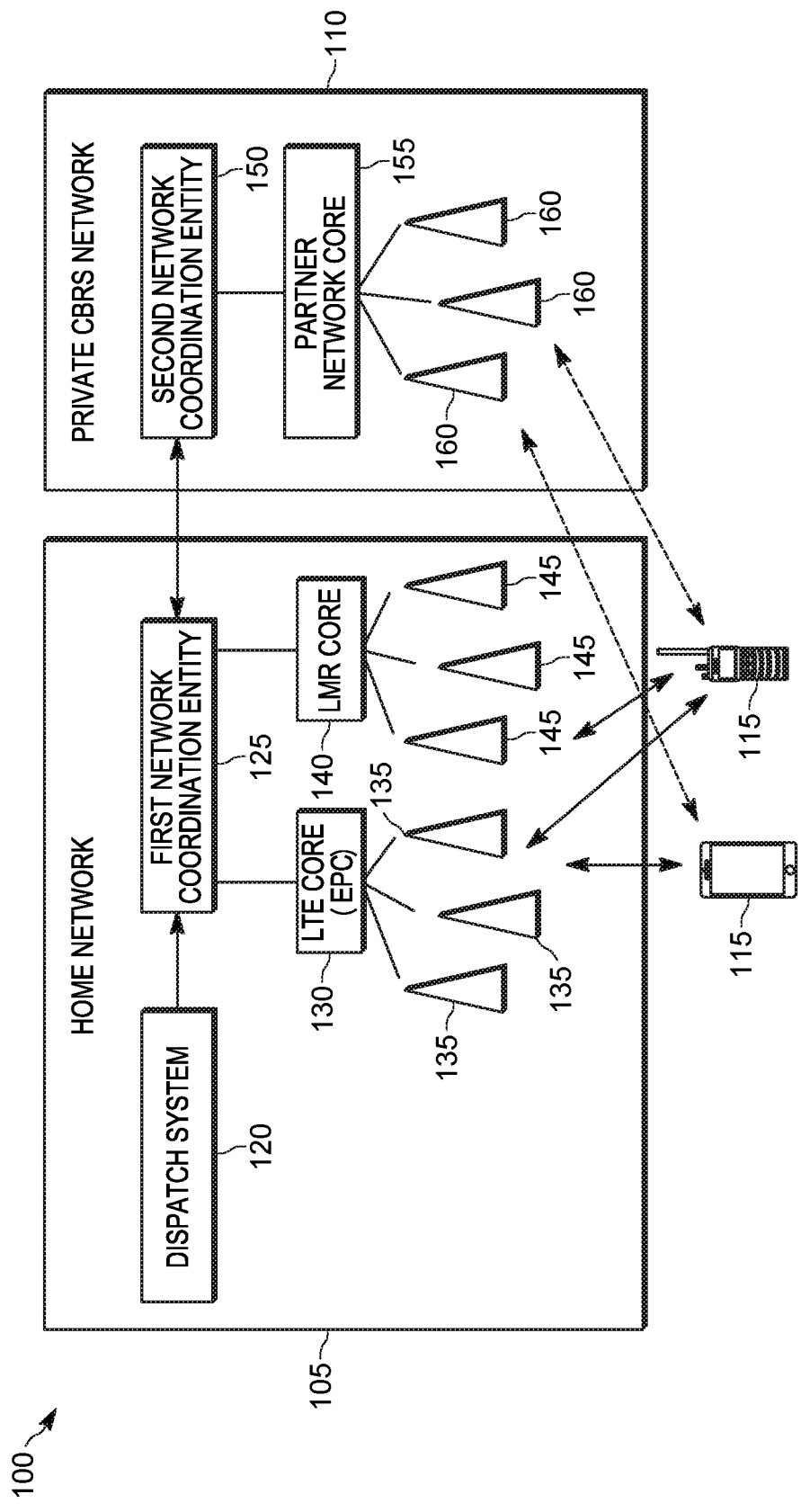
FIG. 1 is a block diagram of system for dynamically managing a private network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Due to new availability of unlicensed and shared spectrum, on-premises or personal broadband systems are currently being deployed by many public and private entities. These deployments are expected to provide supplemental in-building coverage and capacity. The inventors have recognized that public safety organizations may leverage on-premises broadband systems to provide supplemental coverage to user devices of public safety organizations. An example of on-premises broadband system is a citizens broadband radio service (CBRS) system.

While leveraging private networks to increase coverage seems straightforward, registering with such networks is not a simple matter.

In public and large-scale private networks, a network service provider will typically provide network coverage to several guest devices. In example, a network service provider may provide a public land mobile network (PLMN) ID to guest devices that operate on the PLMN network. The PLMN ID allows the guest device to join and communicate with any base station or Long Term Evolution (LTE) site of the network service provider. When an entity sets up an on-premises broadband system, for example, a CBRS network in a localized area such as within a building, a campus, or the like, the CBRS network may operate in a Closed Subscriber Group (CSG) mode with the guest devices that are allowed to join the CBRS network configured with a corresponding CSG ID. Guest devices that are not configured with the CSG ID associated with the CBRS network cannot join and operate on the CBRS network.

As a consequence, one embodiment provides a method for dynamically allowing a guest device to a join a private citizens broadband radio systems (CBRS) network. The method includes determining, using a home network of the guest device, one of a location of the guest device and a location of a public safety incident. The public safety incident is associated with the guest device. The method also includes determining, using the home network and a database of coverage areas of partner private networks, that one of the location of the guest device and the location of the public safety incident is in a coverage area of the private CBRS network. The method further includes reconfiguring the private CBRS network to allow operation of the guest device on the private CBRS network, and operating the guest device on the private CBRS network.

Another embodiment provides a system for dynamically allowing a guest device to operate on a private citizens broadband radio systems (CBRS) network. The system includes an allowed closed subscriber group list included in the guest device. The system also includes a home network configured to provide home network coverage to the guest device and determine that one of a location of the guest device and a location of a public safety incident is in a coverage area of the private CBRS network, wherein the public safety incident is associated with the guest device. The private CBRS network is a partner network of the home network and configured to provide network coverage to a plurality of subscriber devices that include a closed subscriber group ID associated with the private CBRS network. The system further includes a network coordination entity configured to coordinate between the home network and the private CBRS network. The home network instructs the private CBRS network over the network coordination entity to temporarily disable a closed subscriber group restriction of the private CBRS network. The guest device is operated on the private CBRS network in response to temporarily disabling the closed subscriber group restriction of the private CBRS network.

Another embodiment provides a home network including a plurality of base stations configured to provide home network coverage to a guest device and a transceiver configured to facilitate communications between the home network and a network coordination entity. The home network also includes an electronic processor coupled to the transceiver and communicatively coupled to the plurality of base stations. The electronic processor is configured to determine one of a location of the guest device and a location of a public safety incident. The public safety incident is associated with the guest device. The electronic processor is also configured to determine, based on a database of coverage areas of partner private networks, that one of the location of the guest device and the location of the public safety incident is in a coverage area of the private CBRS network, and reconfigure the private CBRS network to allow operation of the guest device on the private CBRS network.

FIG. 1 is a block diagram of one example embodiment of a system 100 for dynamically allowing a guest device to a join a private citizens broadband radio systems (CBRS) network. In the example illustrated, the system 100 includes a home network 105, a private CBRS network 110, and one or more communication devices 115 (singularly referred to as a "guest device 115"). The home network 105 is, for example, a radio or cellular network operated for a public safety organization. The public safety organization may be a police department, a fire department, an emergency medical services agency, forestry agency, and the like. The home network 105 includes a dispatch system 120, a first network coordination entity 125, a Long-Term Evolution (LTE) core 130, a plurality of LTE sites 135 (for example, a plurality of base stations), a Land Mobile Radio (LMR) core 140, and a plurality of LMR sites 145 (for example, a plurality of base stations).

The communication devices 115 are configured to operate with the home network 105. The communication devices 115 may be referred to as "guest devices 115" when they operate with other networks, for example, the private CBRS network 110.

The dispatch system 120 is, for example, a computer-aided dispatch, a 911 dispatch, an alert system, or the like of the public safety organization. The dispatch system 120 may act as a controller of the home network 105 to control the network coverage provided by the home network 105. The first network coordination entity 125 facilitates communication between the home network 105 and one or more partner networks, for example, the private CBRS network 110.

The LTE core 130 (also known as an evolved packet core) along with the plurality of LTE sites 135 provides cellular coverage (for example, home network coverage) to guest devices 115 of the home network 105. The LTE sites 135 are, for example, eNodeBs that communicate directly with the guest devices 115 and route communications between the guest devices 115 and other guest devices 115 or the dispatch system 120. Similarly, the LMR core 140 along with the plurality of LMR sites 145 provide radio coverage (for example, home network coverage) to guest devices 115 of the home network 105. The LMR sites 145 are, for example, radio sites that communicate directly with the guest devices 115 and route communications between the guest devices 115 and other guest devices 115, or the dispatch system 120. In the example illustrated, the home network 105 includes both an LTE core 130 and an LMR core 140 to provide LTE and LMR coverage to the guest devices 115. In other embodiments, the home network 105 may include only one of the LTE core 130 or the LMR core 140 to provide network coverage to the guest devices 115.

The private CBRS network 110 is a CBRS network deployed by a partner entity (public or private) and configured in a manner that the guest devices 115 can get additional capacity and coverage via the private CBRS network 110. The private CBRS network 110 includes a second network coordination entity 150, a partner network core 155, and one or more partner network sites 160. The second network coordination entity 150 facilitates communication between the private CBRS partner network 110 and the home network 105 or another partner network.

The partner network core 155 along with the one or more partner network sites 160 provides cellular coverage to a plurality of subscriber devices of the private CBRS network 110. The partner network sites 160 are, for example, eNodeBs or radio sites that communicate directly with the guest devices 115 and route communications between the guest devices 115 and other guest devices 115. The partner network sites 160 may be provided in an indoor location (for example, in a building) or at an outdoor location (for example, in a forest campus).

The guest devices 115 are, for example, two-way radios, smart telephones, tablet computers, smart watches, vehicular two-way radios, and the like. Each entity may assign the guest devices 115 to users of the entity. The guest devices 115 can then be used over the network provided for the entity.

Figure 2:
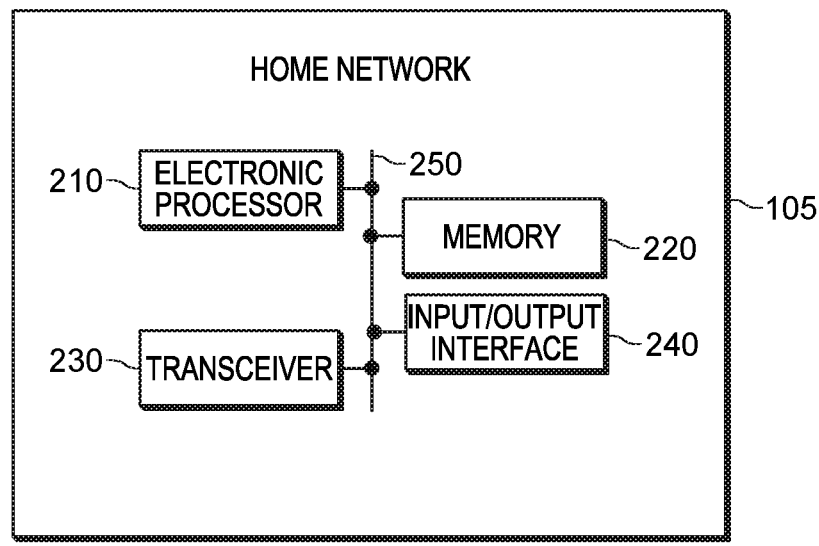
FIG. 2 is a block diagram of a home network of the system of FIG. 1 in accordance with some embodiments.

FIG. 2 is a block diagram of one example embodiment of the home network 105. In the example illustrated, the home network 105 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). The electronic processor 210, the memory 220, the transceiver 230 may be provided in the dispatch system 120 or may be distributed among the different components of the home network 105. In one example, the electronic processor 210 is a centralized processor residing in, for example, the dispatch system 120. In other example, the functionality of the electronic processor 210 and the home network 105 may be distributed across one or more processors of the home network 105 provided in the different components of the home network 105.

In some embodiments, the electronic processor 210 is implemented as a microprocessor with separate memory, for example, the memory 220. In other embodiments, the electronic processor 210 is implemented as a microcontroller or digital signal processor (with memory 220 on the same chip). In other embodiments, the electronic processor 210 is implemented using multiple processors. In addition, the electronic processor 210 may be implemented partially or entirely as, for example, a field-programmable gate array (FPGA), an application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the home network 105 as described herein. The memory 220 may include, for example, a program storage area and a data storage area. The program storage area and the data storage area may include combinations of different types of memory, for example, read-only memory and random-access memory.

The transceiver 230 enables wired or wireless communication between the home network 105 and external networks (for example, private CBRS network 110) and may form part of the first network coordination entity 125. In some embodiments, rather than a transceiver 230 the home network 105 may include separate transmitter and receiver components. The input/output interface 240 may include one or more input components (for example, a keyboard, a mouse, and the like), one or more output components (for example, a display, a speaker, and the like), or a combined input/output component (for example, a touchscreen display).

Figure 3:
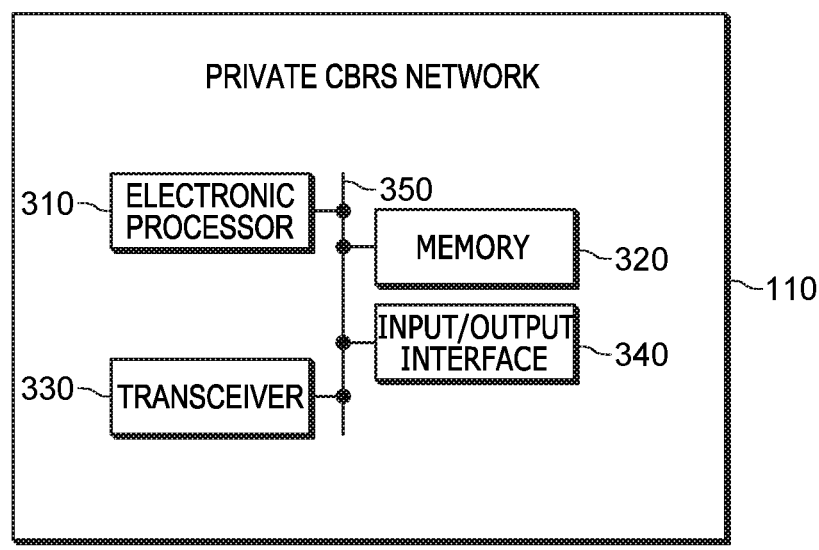
FIG. 3 is a block diagram of a private citizens broadband radio service (CBRS) network of the system of FIG. 1 in accordance with some embodiments.

FIG. 3 is a block diagram of one example embodiment of the private CBRS network 110. In the example illustrated, the private CBRS network 110 includes an electronic processor 310, a memory 320, a transceiver 330, and an input/output interface 340. The electronic processor 310, the memory 320, the transceiver 330, and the input/output interface 340 communicate over one or more control and/or data buses (for example, a communication bus 350). In one example, the electronic processor 310 is a centralized processor residing in, for example, the partner network core 155. In other example, the functionality of the electronic processor 310 and the private CBRS network 110 may be distributed across one or more processors of the private CBRS network 110 provided in the different components of the private CBRS network 110. The electronic processor 310, the memory 320, the transceiver 330, and the input/output interface 340 may be implemented similar to the electronic processor 210, the memory 220, the transceiver 230, and the input/output interface 240 of the home network 105.

During a public safety incident, for example, a building fire, traffic accident, a law enforcement investigation or situation, and the like, public safety personnel are deployed to the location of the public safety incident. In some situations, the home network 105 of the public safety organization may provide limited or no coverage at the location of the public safety incident. However, the location of the public safety incident may be sufficiently covered by the private CBRS network 110. To join the private CBRS network 110, the guest devices 115 are configured with a CSG ID associated with the private CBRS network 110. Without the CSG ID, the guest devices 115 may not join and operate over the private CBRS network 110. Since the guest devices 115 associated with the home network 105 do not have the CSG ID of the private CBRS network 110, the guest devices 115 cannot join and operate over the private CBRS network 110.

Figure 4:
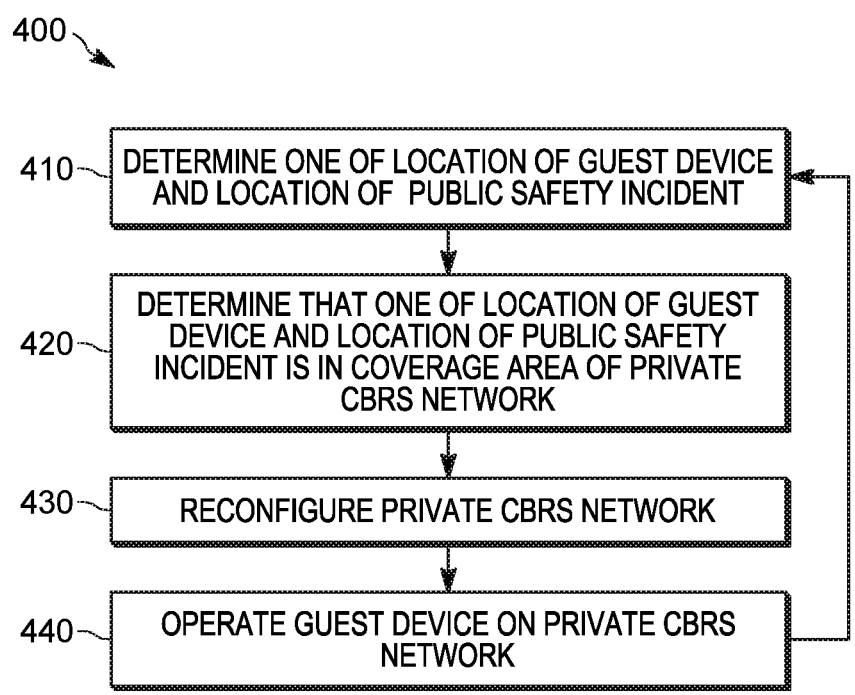
FIG. 4 is a flowchart of a method for dynamically allowing a guest device to join the closed private CBRS network in accordance with some embodiments.

FIG. 4 is a flowchart of one example method 400 for dynamically allowing a guest device 115 to join the closed private CBRS network 110. In the example illustrated, the method 400 includes determining, using the home network 105 of the guest device 115, one of a location of the guest device 115 and a location of a public safety incident (at block 410). The public safety incident is associated with the guest device 115. That is, the guest device 115 is associated with a user and the user is associated with an incident, for example, via dispatch. An incident records in a records management system then a data field or entry with a user name associated with the user and the guest device 115. The guest device 115 may self-report its location based on, for example, global positioning system (GPS) signals received by the guest device 115. The location of the public safety incident is determined based on, for example, a dispatcher input, a user input, and the like.

The method 400 also includes determining, using the home network 105 and a database of coverage areas of partner private networks, that one of the location of the guest device 115 and the location of the public safety incident is in a coverage area of the private CBRS network 110 (at block 420). The home network 105 stores a database of private CBRS networks 110 in the memory 220. The database includes a list of all the private CBRS networks 110 and their corresponding coverage area. The database may be generated and continually updated by an administrator of the home network 105. The home network 105 refers the database to determine whether there is a private CBRS network 110 that provides network coverage at the location of the guest device 115 or the location of the public safety incident (for example, determine a proximity of the guest device 115 to a private CBRS network 110).

In some embodiments, the guest device 115 may be configured to determine and report inter-frequency measurement to the home network 105. The guest device 115 measures the reference signal received power (RSRP) and periodically sends the inter-frequency measurements to the home network 105. The home network 105 may determine the location of the guest device 115 and that the guest device 115 is within the coverage area of the private CBRS network 110 based on the reports from the guest device 115.

The method 400 also includes reconfiguring the private CBRS network 110 to allow operation of the guest device 115 on the private CBRS network 110 (at block 430). In one example, reconfiguring the private CBRS network 110 to allow operation of the guest device 115 on the private CBRS network 110 includes temporarily disabling a CSG restriction of the private CBRS network 110. The home network 105 instructs or sends a request to the private CBRS network 110 over the first network coordination entity 125 and the second network coordination entity 150. When the private CBRS network 110 receives the request from the home network 105, the private CBRS network 110 disables the CSG restriction such that any guest device 115 including, for example, the PLMN ID associated with the private CBRS network 110 can join and operate over the private CBRS network 110. The CSG restriction may be turned back on after the resolution of the public safety incident or when the guest device 115 leaves the coverage area of the private CBRS network 110.

In some embodiments, reconfiguring the private CBRS network 110 may include disabling the CSG restriction of the private CBRS network 110 and registering the guest device 115 with the private CBRS network 110. The home network 105 sends a request to the private CBRS network 110 over the first network coordination entity 125 and the second network coordination entity 150. When the private CBRS network 110 receives the request from the home network 105, the private CBRS network 110 disables the CSG restriction. The guest device 115 then attaches to the private CBRS network 110 so that the guest device 115 may be operated on the private CBRS network 110

Reconfiguring the private CBRS network 110 may also include provisioning, using the private CBRS network 110, an allowed CSG list of the guest device 115 to include a closed subscriber group ID of the private CBRS network 110. The private CBRS network 110 provisions the CSG list of the guest device 115, for example, over-the-air. Provisioning of the CSG list includes the private CBRS network 110 providing the CSG ID associated with the private CBRS network 110 to the guest device 115. The guest device then uses the CSG ID to join the private CBRS network 110 when the CSG restriction is enabled. Reconfiguring the private CBRS network 110 then includes enabling the CSG restriction of the private CBRS network 110 in response to provisioning the allowed CSG list of the guest device 115.

In some embodiments, the private CBRS network 110 is reconfigured in response to determining that one of the location of the guest device 115 and the location of the public safety incident is in the coverage area of the private CBRS network 110. In some embodiments, the private CBRS network 110 is reconfigured in response to the guest device 115 detecting the private CBRS network 110 and reporting the inter-frequency measurement. In other embodiments, private CBRS network 110 is reconfigured in response to determining that the signal level (for example, based on an Received Signal Strength Indicator (RSSI), RSRP, or Reference Signal Received Quality (RSRQ) measurement) from the home network 105 drops below a threshold or when the guest device 115 disconnects from the home network 105.

The method 400 also includes operating the guest device 115 on the private CBRS network 110 (at block 440). The guest device 115 is operated on the private CBRS network 110 similarly as on the home network 105 to access the services provided by the home network 105. The method 400 may repeat for each new public safety incident.

Figure 5:
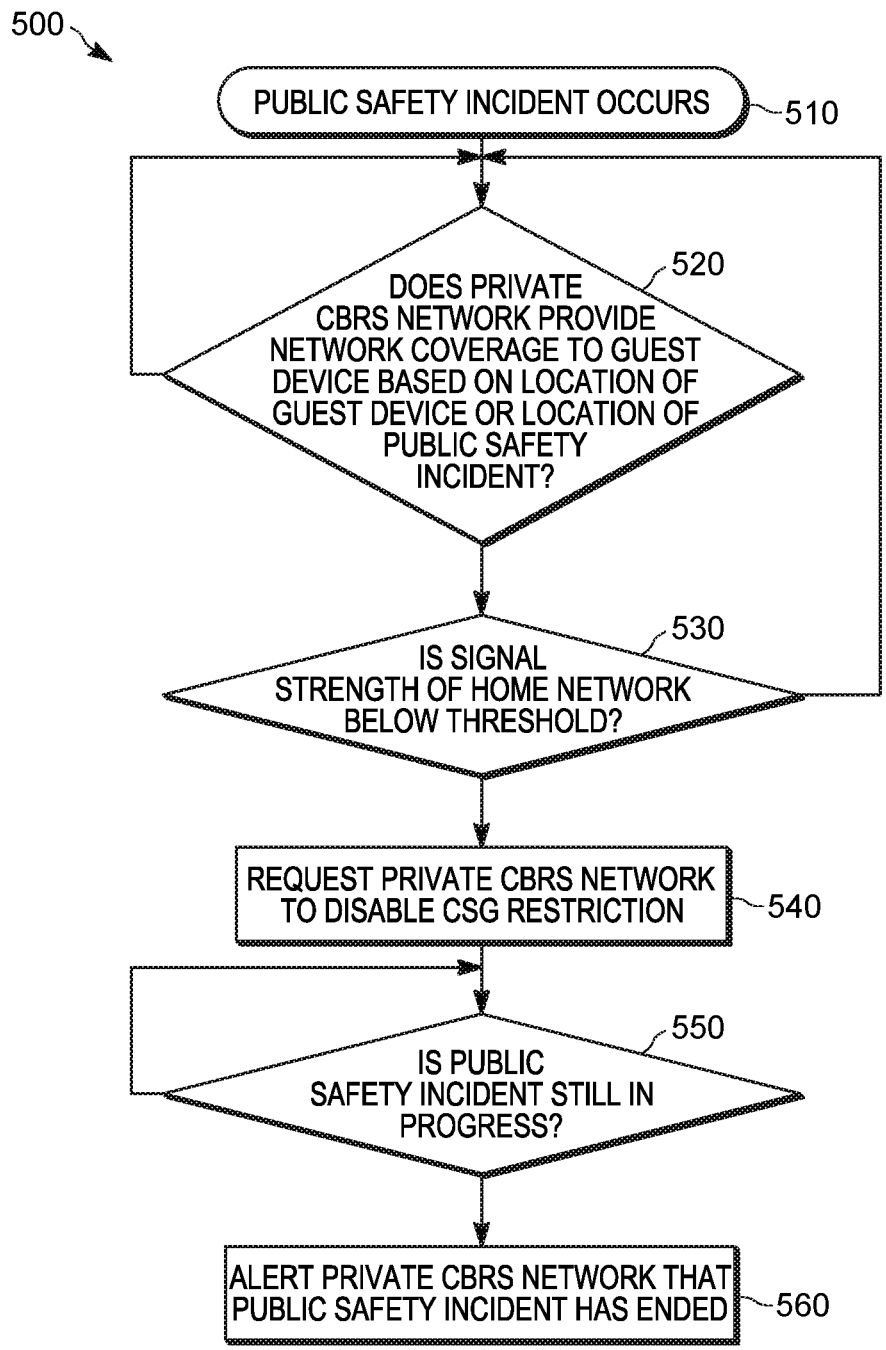
FIG. 5 is a flowchart of a method for dynamically allowing a guest device to join the closed private CBRS network in accordance with some embodiments.

FIG. 5 is a flowchart of one example method 500 for dynamically allowing a guest device 115 to join a closed private CBRS network 110. In the example illustrated, the method 500 begins when a public safety incident occurs (at block 510). The method 500 includes determining whether a private CBRS network 110 can provide network coverage to the guest device 115 based on a location of the guest device 115 or the location of the public safety incident (at block 520). The home network 105 refers the database to determine whether there is a private CBRS network 110 that provides network coverage at the location of the guest device 115 or the location of the public safety incident.

When the location of the guest device 115 or the location of the public safety incident is covered by a private CBRS network 110, the method 500 may optionally include determining whether the signal strength of the home network 105 is below a threshold (at block 530). When the home network 105 provides sufficient coverage at the location of the guest device 115 or the location of the public safety incident, supplemental coverage from the private CBRS network 110 may not be required. The home network 105 or the guest device 115 may compare the signal strength to a signal strength threshold pre-stored in the home network 105 or the guest device 115.

When the signal strength of the home network 105 is below the threshold, the method 500 includes requesting the private CBRS network 110 to disable the CSG restriction (at block 540). As discussed above, the home network 105 requests the private CBRS network 110 through the first network coordination entity 125 and the second network coordination entity 150.

The method 500 also includes determining whether the public safety incident is still in progress (at block 550). As long as the public safety incident is in progress, the private CBRS network 110 may keep the CSG restriction disabled. When the public safety incident is no longer in progress, the method 500 includes alerting the private CBRS network 110 that the public safety incident has ended (at block 560). The home network 105 alerts the private CBRS network 110 through the first network coordination entity 125 and the second network coordination entity 150. The private CBRS network 110 enables the CSG restriction in response to receiving the alert from the home network 105. The method 500 may repeat for each new public safety incident.

Figure 6:
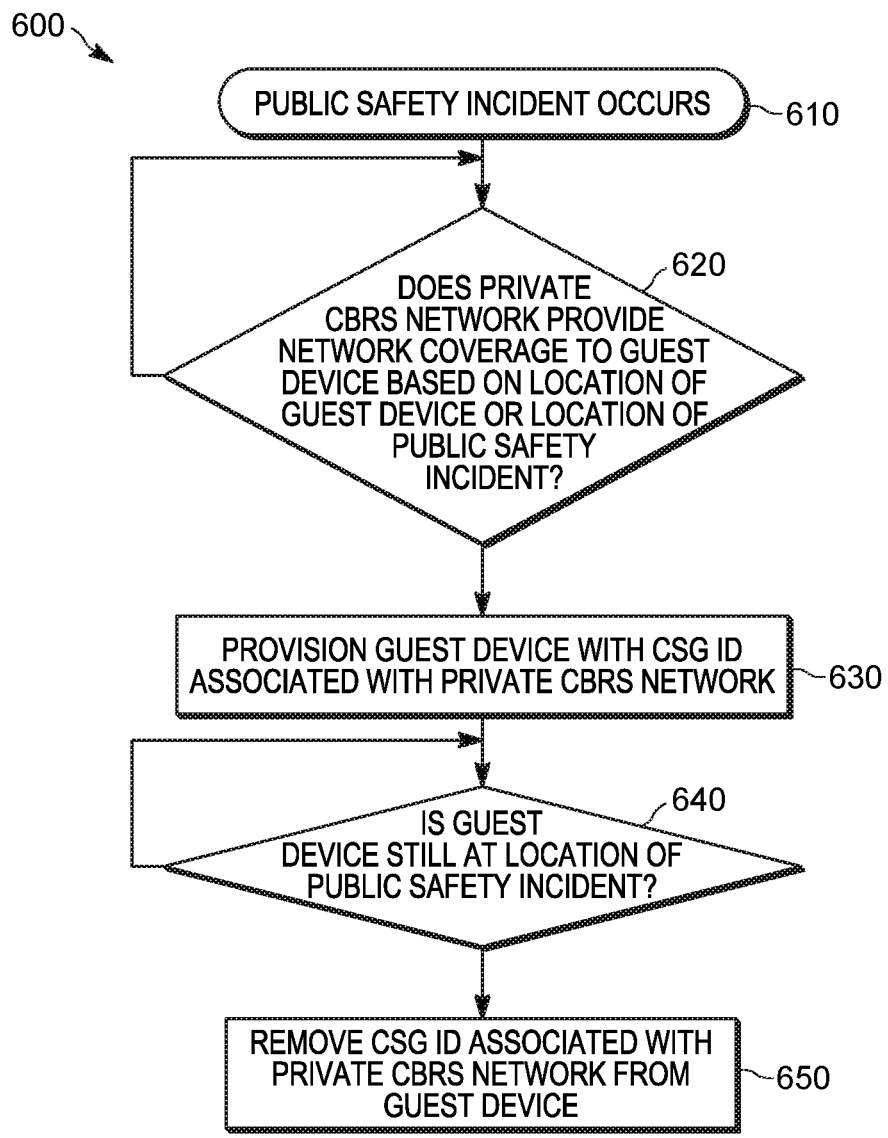
FIG. 6 is a flowchart of a method for dynamically allowing a guest device to join the closed private CBRS network in accordance with some embodiments.

FIG. 6 is a flowchart of one example method 600 for dynamically allowing a guest device 115 to join a closed private CBRS network 110. In the example illustrated, the method 600 begins when a public safety incident occurs (at block 610). The method 600 includes determining whether a private CBRS network 110 can provide network coverage to the guest device 115 based on a location of the guest device 115 or the location of the public safety incident (at block 620). The home network 105 refers the database to determine whether there is a private CBRS network 110 that provides network coverage at the location of the guest device 115 or the location of the public safety incident.

When the location of the guest device 115 or the location of the public safety incident is covered by a private CBRS network 110, the method 600 includes provisioning, using the home network 105, the guest device 115 with the CSG ID associated with the private CBRS network 110 (at block 630). The home network 105 updates the CSG list of the guest device 115 over-the-air to include the CSG ID associated with the private CBRS network 110. The home network 105 may receive the CSG ID associated with the private CBRS private network 110 from the private CBRS private network 110 over the first network coordination entity 125 and the second network coordination entity 150.

The method 600 also includes determining whether the guest device 115 is still at the location of the public safety incident (at block 640). As long as the guest device 115 is at the location public safety incident, the guest device 115 can be continued to be operated on the private CBRS network 110. When the guest device 115 is no longer at the location of the public safety incident, the method 600 includes removing the CSG ID associated with the private CBRS network 110 from the guest device 115 (at block 650). The home network 105 may re-provision the CSG list of the guest device 115, for example, when the guest device 115 returns to the home network 105 after the public safety incident.

Figure 7:
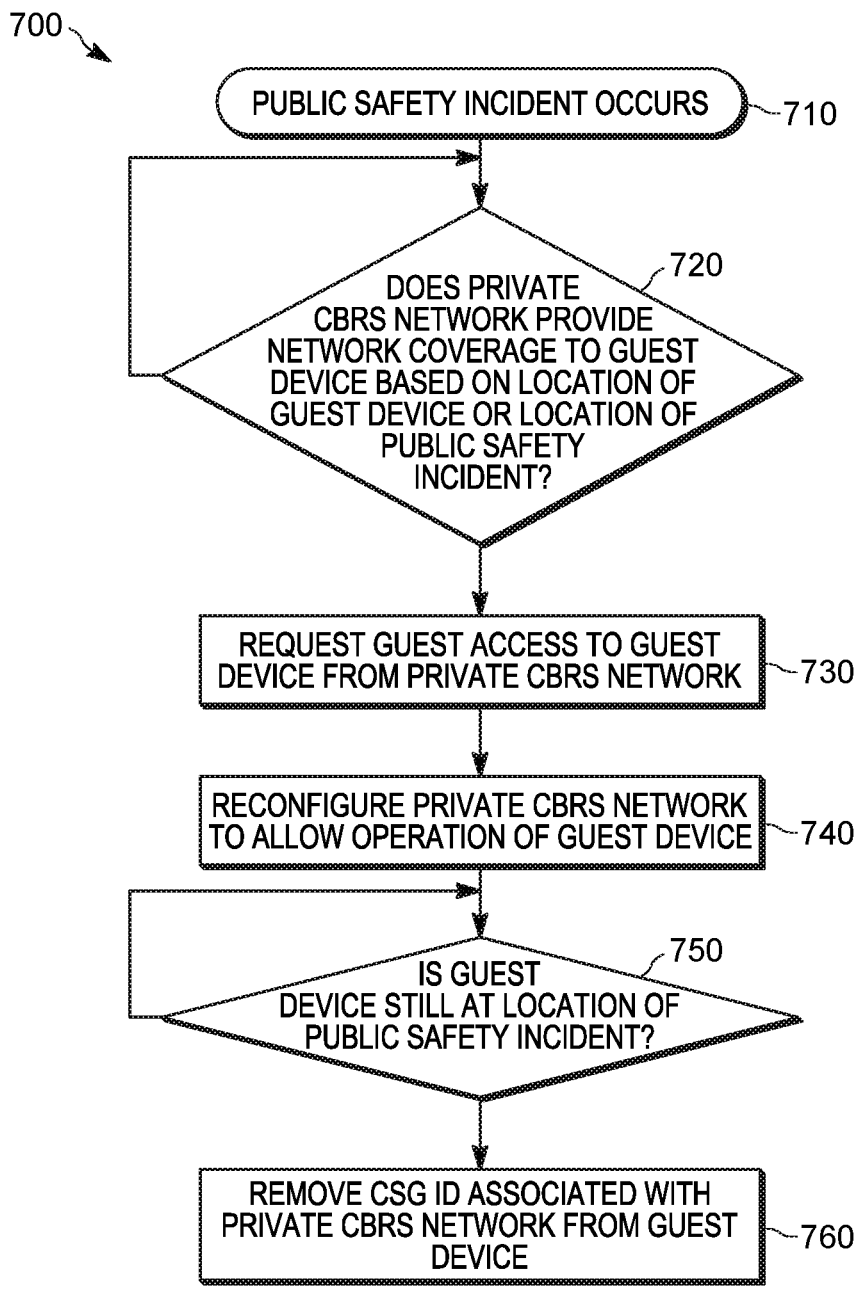
FIG. 7 is a flowchart of a method for dynamically allowing a guest device to join the closed private CBRS network in accordance with some embodiments.

FIG. 7 is a flowchart of one example method 700 for dynamically allowing a guest device 115 to join a closed private CBRS network 110. In the example illustrated, the method 700 begins when a public safety incident occurs (at block 710). The method 700 includes determining whether a private CBRS network 110 can provide network coverage to the guest device 115 based on a location of the guest device 115 or the location of the public safety incident (at block 720). The home network 105 refers the database to determine whether there is a private CBRS network 110 that provides network coverage at the location of the guest device 115 or the location of the public safety incident.

When the location of the guest device 115 or the location of the public safety incident is covered by a private CBRS network 110, the method 700 includes requesting, using the home network 105, guest access to the guest device 115 from the private CBRS network 110 (at block 730). As discussed above, the home network 105 requests the private CBRS network 110 through the first network coordination entity 125 and the second network coordination entity 150.

The method 700 also includes reconfiguring the private CBRS network 110 allow operation of the guest device 115 on the private CBRS network 110 (at block 740). For example, when the guest device 115 arrives at the location of the public safety incident, the private CBRS network 110 disables a CSG restriction of the private CBRS network 110 and registers the guest device 115 with the private CBRS network 110. The private CBRS network 110 provisions an allowed CSG list of the guest device 115 to include a CSG ID of the private CBRS network 110. The private CBRS network 110 provisions the CSG list of the guest device 115, for example, over-the-air. Provisioning includes the private CBRS network 110 providing the CSG ID associated with the private CBRS network 110 to the guest device 115. The guest device 115 uses the CSG ID to join the private CBRS network 110 when the CSG restriction is enabled. The private CBRS network 110 then enables the CSG restriction.

The method 700 also includes determining whether the guest device 115 is still at the location of the public safety incident (at block 750). As long as the guest device 115 is at the location public safety incident, the guest device 115 can be continued to be operated on the private CBRS network 110. When the guest device 115 is no longer at the location of the public safety incident, the method 700 includes removing the CSG ID associated with the private CBRS network 110 from the guest device 115 (at block 760). The home network 105 may re-provision the CSG list of the guest device 115, for example, when the guest device 115 returns to the home network 105 after the public safety incident.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for dynamically allowing a guest device to operate on a private citizens broadband radio systems (CBRS) network comprising:
   an allowed closed subscriber group list included in the guest device;
   a home network configured to provide home network coverage to the guest device and determine that one of a location of the guest device and a location of a public safety incident is in a coverage area of the private CBRS network, wherein the public safety incident is associated with the guest device;
   wherein the private CBRS network is a partner network of the home network and configured to provide network coverage to a plurality of subscriber devices that include a closed subscriber group ID associated with the private CBRS network; and
   a network coordination entity configured to coordinate between the home network and the private CBRS network,
   wherein the home network instructs the private CBRS network over the network coordination entity to temporarily disable a closed subscriber group restriction of the private CBRS network, and wherein the guest device is operated on the private CBRS network in response to temporarily disabling the closed subscriber group restriction of the private CBRS network.

2. The system of claim 1, wherein the home network instructs the private CBRS network to temporarily disable the closed subscriber group restriction of the private CBRS network in response to determining that one of the location of the guest device and the location of the public safety incident is in the coverage area of the private CBRS network.

3. The system of claim 2, wherein the home network instructs the private CBRS network to temporarily disable the closed subscriber group restriction of the private CBRS network in response to determining that a signal strength of the home network is below a threshold.

4. The system of claim 2, wherein the home network determines whether the public safety incident is still in progress, and wherein in response to determining that the public safety incident is not still in progress, the home network alerts the private CBRS network that the public safety incident has ended.

5. The system of claim 2, wherein in response to the home network instructs the private CBRS network to temporarily disable the closed subscriber group restriction of the private CBRS network, the private CBRS network
   disables the closed subscriber group restriction of the private CBRS network,
   registers the guest device to the private CBRS network;
   provisions the allowed closed subscriber group list of the guest device to include the closed subscriber group ID associated with the private CBRS network; and
   enables the closed subscriber group restriction of the private CBRS network in response to provisioning the allowed closed subscriber group list of the guest device.

6. The system of claim 5, wherein the home network determines whether the guest device is still at the location of the public safety incident; and
   in response to determining that the guest device is not still at the location of the public safety incident, the home network removes the closed subscriber group ID associated with the private CBRS network from the allowed closed subscriber group list of the guest device.

7. A method for dynamically allowing a guest device to join a private citizens broadband radio systems (CBRS) network, the method comprising:
   determining, using a home network of the guest device, one of a location of the guest device and a location of a public safety incident, wherein the public safety incident is associated with the guest device;
   determining, using the home network and a database of coverage areas of partner private networks, that one of the location of the guest device and the location of the public safety incident is in a coverage area of the private CBRS network;
   reconfiguring the private CBRS network to allow operation of the guest device on the private CBRS network; and
   operating the guest device on the private CBRS network, wherein reconfiguring the private CBRS network includes at least one selected from a group consisting of
   temporarily disabling a closed subscriber group restriction of the private CBRS network,
   disabling the closed subscriber group restriction of the private CBRS network and registering the guest device with the private CBRS network, and
   provisioning, using the private CBRS network, an allowed closed subscriber group list of the guest device to include a closed subscribed group ID of the private CBRS network.

8. The method of claim 7, wherein the private CBRS network is reconfigured to allow operation of the guest device on the private CBRS network in response to determining that one of the location of the guest device and the location of the public safety incident is in the coverage area of the private CBRS network.

9. The method of claim 7, wherein the private CBRS network is reconfigured to allow operation of the guest device on the private CBRS network in response to determining that a signal strength of the home network is below a threshold.

10. The method of claim 7, further comprising:
    determining whether the public safety incident is still in progress; and
    in response to determining that the public safety incident is not still in progress, alerting the private CBRS network that the public safety incident has ended.

11. The method of claim 7, reconfiguring the private CBRS network to allow operation of the guest device on the private CBRS network includes
    enabling the closed subscriber group restriction of the private CBRS network in response to provisioning the allowed closed subscriber group list of the guest device.

12. The method of claim 11, further comprising:
    determining whether the guest device is still at the location of the public safety incident; and
    in response to determining that the guest device is not still at the location of the public safety incident, removing the closed subscriber group ID associated with the private CBRS network from the allowed closed subscriber group list of the guest device.

13. A home network comprising:
    a plurality of base stations configured to provide home network coverage to a guest device;
    a transceiver configured to facilitate communications between the home network and a network coordination entity; and
    an electronic processor coupled to the transceiver and communicatively coupled to the plurality of base stations, the electronic processor configured to
    determine one of a location of the guest device and a location of a public safety incident, wherein the public safety incident is associated with the guest device,
    determine, based on a database of coverage areas of partner private networks, that one of the location of the guest device and the location of the public safety incident is in a coverage area of the private CBRS network, and
    reconfigure the private CBRS network to allow operation of the guest device on the private CBRS network, wherein reconfiguring the private CBRS network includes at least one selected from a group consisting of
    temporarily disabling a closed subscriber group restriction of the private CBRS network,
    disabling the closed subscriber group restriction of the private CBRS network and registering the guest device with the private CBRS network, and
    provisioning, using the private CBRS network, an allowed closed subscriber group list of the guest device to include a closed subscribed group ID of the private CBRS network.

14. The home network of claim 13, wherein the private CBRS network is reconfigured to allow operation of the guest device on the private CBRS network in response to determining that one of the location of the guest device and the location of the public safety incident is in the coverage area of the private CBRS network.

15. The home network of claim 13, wherein the private CBRS network is reconfigured to allow operation of the guest device on the private CBRS network in response to determining that a signal strength of the home network is below a threshold.

16. The home network of claim 13, wherein the electronic processor is further configured to:
- determine whether the public safety incident is still in progress; and
- in response to determining that the public safety incident is not still in progress, alert the private CBRS network that the public safety incident has ended.

17. The home network of claim 13, wherein the electronic processor is further configured to:
- determine whether the guest device is still at the location of the public safety incident; and
- in response to determining that the guest device is not still at the location of the public safety incident, remove the closed subscriber group ID associated with the private CBRS network from the allowed closed subscriber group list of the guest device.

\* \* \* \* \*